United States Patent [19]

Huang et al.

[11] Patent Number: 5,874,515
[45] Date of Patent: Feb. 23, 1999

[54] METHOD TO REDUCE GEL FORMATION IN PET RESIN

[75] Inventors: Xiaoyan Huang, Gastonia; Ligia Dominguez, Charlotte, both of N.C.

[73] Assignee: Hoechst Celanese Corporation, Charlotte, N.C.

[21] Appl. No.: 997,144

[22] Filed: Dec. 23, 1997

[51] Int. Cl.$^6$ .................................................. C08G 63/00
[52] U.S. Cl. ......................... 528/176; 528/193; 528/271; 528/287
[58] Field of Search .................................. 528/176, 193, 528/271, 287

[56] References Cited

U.S. PATENT DOCUMENTS 5,106,892  4/1992  Chilloe, et al. ........................ 524/120

FOREIGN PATENT DOCUMENTS 0501545  9/1992  European Pat. Off. ........ C08G 63/87

*Primary Examiner*—Terressa Mosley
*Attorney, Agent, or Firm*—Gregory N. Clements; Walter M. Douglas

[57] ABSTRACT

There is disclosed a process for reducing the number of gels generated in polyethylene terephthalate (PET) resin. Gels are crosslinked polymers created by thermal and thermo-oxidative degradation induced during polymer production. The instant process comprises the addition of primary and secondary antioxidants prior to the PET polycondensation reaction in order to reduce the amount of thermal degradation which occurs. The polyethylene terephthalate produced by this process formed approximately 25 to 90% fewer gels while maintaining physical properties suitable for use in fiber, film, and molding applications.

32 Claims, 1 Drawing Sheet

METHOD TO REDUCE GEL FORMATION IN PET RESIN

RELATED APPLICATIONS

This Application is related to U.S. Patent Application entitled "Method to Reduce Regenerated Acetaldehyde in PET Resin", application Ser. No. 08/997,402, filed Dec. 23, 1997, which application was filed concurrently herewith and which is hereby incorporated by reference.

BACKGROUND OF THE INVENTION

This invention relates to an improvement in making polyethylene terephthalate (PET) useful in fiber, film, and molding applications.

PET may be prepared, as is well known, by the ester interchange of dimethyl terephthalate with ethylene glycol or by the direct esterification of ethylene glycol and terephthalic acid, followed by condensation polymerization (hereinafter "polycondensation") in the presence of a catalyst such as antimony trioxide ($Sb_2O_3$), e.g., at a temperature of about 275° to 300° C. The PET product may then be extruded and pelletized to produce polymer chip.

Depending on the particular end use intended for the polymer, the polymer chip may then be subjected to a solid state polymerization process in order to increase the polymer's physical properties, i.e. to increase intrinsic viscosity and/or to remove acetaldehyde trapped in the pellets during manufacture. It is widely known in that art that the intrinsic viscosity of PET may be increased by solid state polymerization. In this connection, see e.g. U.S. Pat. Nos. 4,223,128 and 4,064,112, respectively.

Gels are three dimensional, networked polymeric structures, formed by crosslinking reactions which occur due to thermal and/or thermo-oxidative degradation. Gel formation is the most severe form of thermally induced degradation, involving the reaction of products produced during earlier stages of the degradation process. It has been postulated that gels are formed via free radical reactions.

Conditions particularly conducive to thermally induced degradation and subsequent gel formation may be present in the polycondensation reactors which produce PET resin on a commercial scale. As discussed above, the polycondensation process involves reacting the PET prepolymer at an elevated temperature, i.e. 275°–300° C. In addition to elevated temperatures conducive to gel formation, massive commercial reactors may also contain "dead spots" due to design imperfections. These "dead spots" are areas near the reactor walls which receive heat, but little or no agitation. PET prepolymer may remain trapped in these "dead spots" for days or even months prior to breaking loose from the reactor wall and passing through the remaining polymer process, giving rise to gels in the final product. Process upsets such as vacuum line air leaks further feed the thermo-oxidative degradation process. In addition, metal catalysts such as those commonly used to increase PET production can decrease the thermal stability of the polymer, thereby forming gels.

The elimination of thermally induced degradation leading to gels in PET resin is important because the presence of gels interferes with the further processing of the polymer chip, as well as the acceptability of the polymer for certain applications. Gels give rise to a variety of difficulties during polymer processing, including high plugging rates in process filters, high yarn break rates, and poor runnability in film manufacturing. In particular, softer gels, which pass through the extrusion process, give rise to broken filaments in fiber production, leading to lower yields. Further, the presence of gels in the extruded product may render PET resin used in film unsuitable for use in high magnification applications, such as microfilm.

Accordingly, a need exists for a commercially acceptable PET resin which generates significantly fewer gels during polymer formation.

In addition to the need for fewer gels, PET resin suitable for use in fiber, film, and molding applications must have adequate IV and color.

DESCRIPTION OF THE PRIOR ART

The search has continued for improved processes for reducing thermal degradation in PET.

Antioxidants have been widely studied and used for preventing PET thermal and thermal oxidative degradation. Karayannidis discloses the use of hindered phenols to improve the thermal stability of polymers. Chilloe, et. al. discloses the use of a mixture of phosphites to improve the thermo-oxidative stability of PET in U.S. Pat. No. 5,106,892, in which antioxidants are added to improve performance of shaped articles whose final use temperature exceeds 120° C. Chilloe also discloses the use of tris (hydroxy-benzyl) benzene in combination with a dual functional molecule in U.S. Pat. No. 5,236,979, in which antioxidants are again intended to provide thermo-oxidative stability to PET parts used at temperatures exceeding 120° C. Further, the use of antioxidants which contain both primary and secondary antioxidant functionality within a single additive in combination with phosphites is similarly known to improve aesthetic qualities of PET photographic film, particularly when those additives are used in conjunction with expensive catalyst systems in order to provide adequate color, as described in EP 0,501,545.

Although the use of antioxidants in order to stabilize or provide aesthetic improvement to the PET end products is known, the impact of various antioxidants on gel formation during polymer production remains undisclosed. Furthermore, no prior art has employed the specific combination of antioxidants of the instant invention in order to reduce gel formation while continuing to provide an economical process which maintains acceptable resin properties, including color.

OBJECTS OF THE INVENTION

Accordingly, an object of the present invention is to provide an economical process for reducing the level of gels formed during PET production while maintaining adequate polymer properties, including color.

These and other objects, as well as the scope, nature and utilization of the claimed invention, will be apparent to those skilled in the art from the following detailed description, examples and the appended claims.

Ratios or proportions of materials given throughout this specification are on a weight basis unless otherwise indicated.

SUMMARY OF THE INVENTION

A process has now been developed for the production of PET resin wherein the PET monomer contains specific antioxidant compounds in order to minimize the amount of gels generated during PET manufacture while maintaining adequate color. In a preferred embodiment this process comprises the addition of specific primary and secondary antioxidants to the PET monomer mixture in a predetermined order immediately prior to polycondensation. In accordance with the present invention, an improved process is provided for producing polyethylene terephthalate chip which comprises the steps of:

(a) providing a prepolymeric mixture comprising bis (2-hydroxyethyl) terephthalate, a polycondensation catalyst, a primary antioxidant in the form of a hindered phenol, and a secondary antioxidant in the form of a phosphonite;

(b) polycondensing said prepolymeric mixture into polymer resin, whereby said polymer resin generates approximately 25 to 90 wt % fewer gels than PET resin which does not contain the antioxidant package, as determined from samples subjected to 300° C. heat treatment for 48 hours in an inert atmosphere.

DESCRIPTION OF THE PREFERRED EMBODIMENTS

Figure 1:
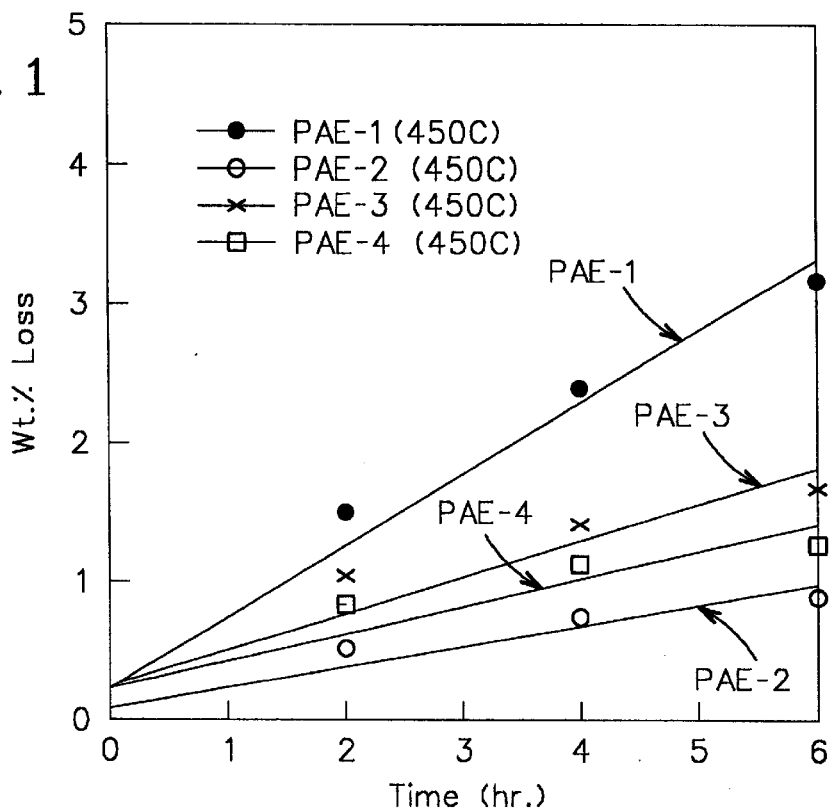
Figure 2:
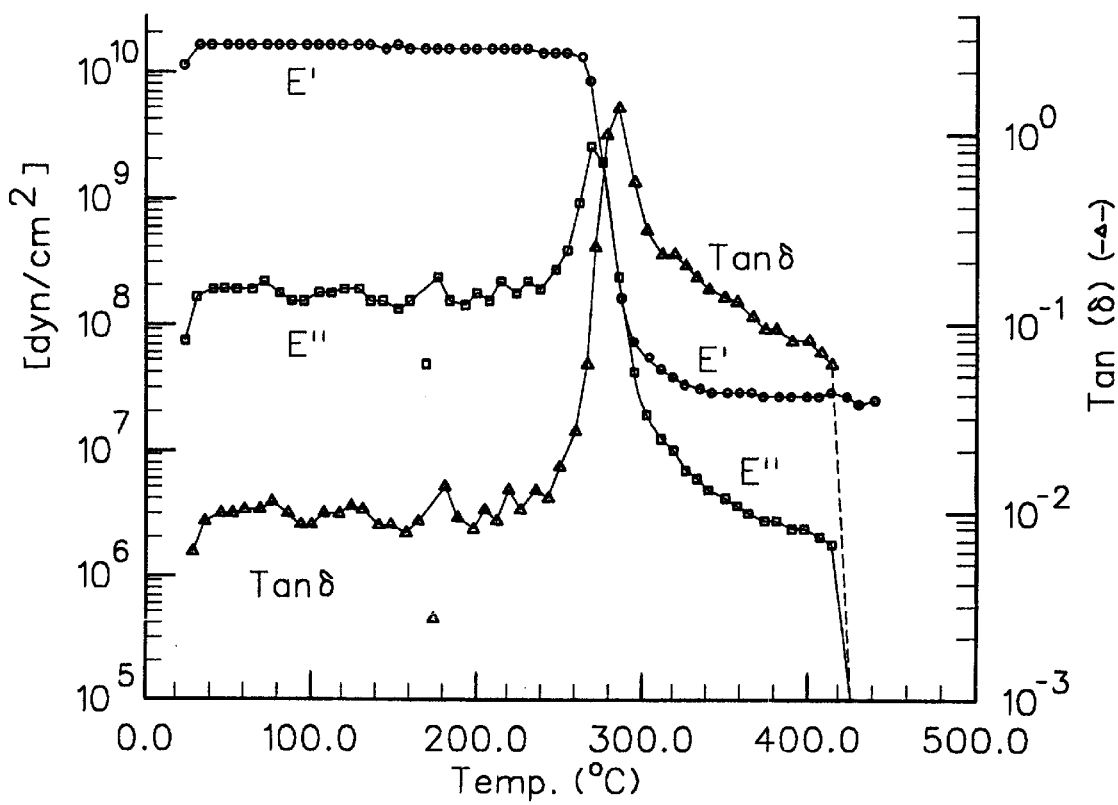

The terms "polyethylene terephthalate" and "PET" as used herein are used generally to include high-molecular weight polymers made by condensing ethylene glycol with dimethyl terephthalate or terephthalic acid no matter how prepared.

Furthermore, these terms are meant to include well-known polyethylene terephthalate polymers which are modified by the inclusion of minor amounts, e.g., less than about 20 percent by weight of the polymer, of comonomers or modifying agents, as is otherwise well known. Such comonomers or modifying agents include aromatic and aliphatic diols and polyols; aromatic and aliphatic carboxylic acids; or single molecules containing both carboxylic and alcohol functionality. Examples of diols include 1,4-butanediol, cyclohexanedimethanol, diethylene glycol and/or 1,3-propanediol. Examples of carboxylic diacids include isophthalic acid, adipic acid, 2,6-naphthalene dicarboxylic acid and p-hydroxy benzoic acid. Minor amounts of chain branching agents and/or chain terminating agents may also be used. Such chain branching agents include, for example, polyfunctional acids and/or polyfunctional alcohols such as trimethylol propane and pentaerythritol. Chain terminating agents include monofunctional alcohols and/or monofunctional carboxylic acids such as stearic acid and benzoic acid. Mixtures of the chain branching and chain terminating agents may also be used. PET which contains such chain branching agents and chain terminating agents is described in U.S. Pat. No. 4,161,579, the disclosure of which is hereby incorporated by reference.

Although the terms polyethylene terephthalate and PET are meant to include polyethylene terephthalate polymers containing minor amounts of modifying agents or chain branching agents, the remainder of this specification, which is intended for the purposes of illustration only, is generally directed to PET which does not contain such added modifying agents or chain branching agents.

The PET useful in the process of the present invention may be prepared by either a batch or continuous polymerization process by any means known to those having ordinary skill in this art. For example, PET may be prepared by the ester interchange, or transesterification, of dialkyl esters of terephthalic acid such as dimethyl terephthalate or by the esterification of terephthalic acid with ethylene glycol.

One embodiment of PET useful in the process of the present invention is prepared by a two step polymerization process which is comprised of first forming a bis-dihydroxy ester prepolymer by conventional transesterification techniques followed by polymerization (hereinafter referred to as polycondensation) of the prepolymer, as is widely known in the art.

The bis-dihydroxy ester prepolymer is formed from the transesterification of dimethylterephthalate with a glycol, such as ethylene glycol. PET prepared using a mixture of dimethyl terephthalate and ethylene glycol preferably contain the glycol in excess, i.e. mixtures wherein the molar ratio of glycol with respect to the dimethyl terephthalate is in the range of from about 2.0 to about 2.5.

A transesterification catalyst is employed to aid in the formation of the prepolymer. The catalyst employed is characterized as one which, upon exposure to the phosphor stabilizers described herein, is rendered substantially inactive.

Various catalysts are known in the art to be suitable for this transesterification step. The catalysts which may be used include organic and inorganic compounds of one or more metals such as manganese, cobalt, zinc, calcium, etc. Typical catalysts heretofore known and which may be utilized include, for example, cobaltous acetate tetrahydrate, manganese acetate (hereinafter "MnAc"), manganous benzoate tetrahydrate, zinc acetate tetrahydrate, etc. The amount of catalyst (or catalyst mixture) employed is that used in conventional systems, and is well known in that art.

The mixture of glycol, dimethyl terephthalate, and transesterification catalyst is then esterified to form prepolymer, as is well known in that art.

Upon completion of the transesterification reaction, certain phosphor-containing stabilizers are introduced into the system in order to sequester the transesterification catalyst, which is then precipitated from the prepolymeric mixture, as is widely known in that art. The use of phosphor-containing compounds converts the esterification catalyst to an insoluble and catalytically inactive metal phosphate complex.

The addition of the phosphor-containing stabilizer does not actually alter the thermal stability of the PET itself, but prevents the acceleration of thermal degradation by deactivating the esterification catalyst.

The term "phosphor-containing" stabilizer as used herein is intended to mean one or more compounds which contain phosphor and which are known in the prior art to be useful as stabilizers in polyester polycondensing reactions. Some of the phosphor compounds suitable for this process are disclosed in U.S. Pat. Nos. 3,028,366 (1962) and 3,962,189 (1976), the disclosure of which is hereby incorporated by reference. In one embodiment, polyphosphoric acid (PPA) is employed. The amount of phosphor-containing compounds employed will vary depending on the amount of transesterification catalyst used. The phosphor-containing stabilizer may be added stoichiometrically or slightly over the stoichiometric ratio.

After the phosphor compounds are introduced into the bis-dihydroxy ester prepolymer solution, other catalysts may be added in order to aid the polycondensation process. These polycondensation catalysts are chosen so as to remain active in the presence of the phosphor-containing stabilizer added previously.

Various antimony compounds are known in the art to be suitable polycondensation catalysts which are not completely deactivated by the presence of phosphor stabilizers. Any suitable form of antimony can be used, including either organic or inorganic compounds of antimony, such as antimony oxides, antimony oxalate, antimony acetate, antimony glycoxide, antimony butoxide, and antimony dibutoxide.

Antimony trioxide, $Sb_2O_3$, is presently preferred because of its general availability.

Antimony catalyst is preferably present as an amount in the range of from about 150 to about 450 parts per million, or more preferably from about 200 to about 300 parts per million parts by weight of the polymer product, as can be readily determined by preliminary tests for any particular case.

Other transition metal-containing compounds may be employed either alone or in combination with the above-described antimony compounds, including germanium and titanium compounds. Although known in the art to increase resin brightness, the use of germanium compounds in particular is cost prohibitive. Preferred additional transition metal-containing compounds are titanium compounds. Examples of these compounds include titanium alkyloxides such as titanium oxalate, titanium acetate, titanium butylate, titanium benzoate, titanium isoproprylate tetrabutyl titanate, acetyl triisopropyl titanate, titanium tetraisopropoxide and titanium glycolate. Complex titanates derived from alkali or alkaline-earth metal alkoxides and esters of titanic acid are also very effective. Inorganic titanates, such as lanthanium titanate, are further examples of titanium based catalysts which can be used.

It is known that catalysts which contain titanium can be used as the sole catalyst. In particular it has believed that titanium alkyloxide in the form of potassium titanyl oxalate, KTiOx, may be used as the sole polycondensation catalyst.

If desired, the polycondensation catalyst may be added along with the glycol and terephthalate at the beginning of the transesterification stage of the process. This is particularly advantageous for operation of the process continuously. However, if polycondensation catalysts which contain titanium are employed, the polycondensation catalyst must be added after transesterification catalyst has been sequestered, due to the fact that titanium has a strong interaction with the phosphor stabilizer.

Subsequent to the addition of phosphor stabilizer and polycondensation catalyst, a two component antioxidant package is introduced in the process. This antioxidant package consists of a combination of primary and secondary antioxidants It is hypothesized that gels are mainly formed through a free radical addition polymerization mechanism. Free radicals can be generated within the PET resin by heat, particularly if or trace amounts of oxygen are contained within the system. Free radical compounds present in the prepolymeric mixture can lead to the formation of three dimensional networked gels. Primary antioxidants behave as radical scavengers to convert active free radicals to stable free radicals. Secondary antioxidants act as peroxide decomposers. Peroxide is an intermediate product of thermo-oxidative degradation, and enhances the free radical polymerization process. It is believed that the antioxidants trap the radicals and intermediate products formed under high temperature and prevent the crosslinking reactions which lead to gels. In particular, it has been observed that the specific combination of primary and secondary antioxidants of the instant invention inhibits free radical degradation reactions, thereby reducing gel formation. Further, it has been shown that this specific combination of primary and secondary antioxidants has no detrimental impact on polymer color. The synergistic effect of this specific combination of primary and secondary antioxidants on overall color is discussed in the Related Patent Application "Method to Reduce Regenerated Acetaldehyde in PET Resin" having Attorney Docket Number HCC-09, and previously incorporated by reference.

The first component of the antioxidant package, the primary antioxidant, is in the form of a hindered phenol, added after the polycondensation catalyst has been allowed to equilibrate for a minimum of approximately 10 minutes in the system. In alternative embodiments, either a monofunctional or a tetrafunctional hindered phenol may be employed in the instant invention. Further, bifunctional hindered phenols are also believed to provide similar useful properties.

Hindered phenols are defined as molecules in which the phenol moiety is stearically hindered by bulky substituent groups. These bulky substituent groups are moieties such as terbutyl, which are attached immediately adjacent to both sides of the phenol group. It is further hypothesized that in the instant invention the phenol must be completely hindered; otherwise, it may produce crosslinking at high temperatures. Complete hindrance is defined as the greatest degree of hindrance attainable for a given phenol.

In the preferred embodiment of the instant invention, the primary antioxidant is a tetrafunctional hindered phenol. This tetrafunctional phenol may be added in an amount ranging generally from about 0.01 to 0.50 weight percent based on the weight of the polymer, preferably from in the range of 0.025 to 0.075.

After allowing the primary antioxidant to equilibrate for a minimum of approximately 10 minutes, the second component contained in the antioxidant package, a trivalent phosphorous compound, is then added. The trivalent phosphorous compound serves as a secondary antioxidant. Trivalent phosphorus compounds include phosphonite and phosphite compounds. In the preferred embodiment, the trivalent phosphorus compound is based on phosphonite. In one specific example of the preferred embodiment, the phosphonite is an aryl phosphonite produced by the reaction of phosphorus trichloride with 1,1'-biphenyl and 2,4-bis(1,1-dimethylethyl)phenol, commercially available from Clariant under the trade name of Sandostab PEPQ (PEPQ). PEPQ may be added in an amount ranging generally from about 0.01 to 0.50 weight percent based on the weight of the polymer, preferably from 0.025 to 0.075.

It has been found that when employing antimony based polycondensation catalysts, it is critical that the hindered phenol be added prior to the trivalent phosphorous compound. Without this step, the antimony catalyst interacts with trivalent phosphorous compounds, reducing the effectiveness of the catalyst, leading in turn to significantly longer polycondensation times. However, when employing a titanium polycondensation catalyst, it is postulated that the order of antioxidant addition may not be critical.

Although in the preferred embodiment the antioxidant is added immediately prior to the start of the polycondensation reaction, it has been proposed that the antioxidant package may instead be added prior to direct esterification. The specific preferred range of intrinsic viscosity depends on end use.

The process of the present invention further comprises polycondensing (polymerizing) the bis-dihydroxyester prepolymer mixture at reduced pressures and elevated temperatures until a polyester of the desired intrinsic viscosity is obtained.

The process of this invention is applicable to the preparation of polyesters derived from dimethyl terephthalate. One or more additional esters, however, may also be incorporated in up to about 20 mole % based on a total ester content of 100 mole %. Other well-known polyester-forming esters include those based on the diacids isophthalic acid, 1,4-cyclohexanedicarboxylic acid and linear lower alkyl diacids such as succinic, glutaric, adipic, sebacic, maleic, fumaric acids, etc.

The glycol component employed in the process of this invention comprises any diol or polyol. Although ethylene glycol is the preferred glycol, the glycol component may comprise a mixture of one or more glycols wherein at least a major portion of which is ethylene glycol. The term "major portion" as used herein is intended to mean that greater than about 50 mole percent and preferably greater than about 85 mole percent, based on the total amount of glycol present, of ethylene glycol is employed. Thus, other known polyester-forming glycols may be employed in amounts less than about 50 mole percent and preferably less than about 15 mole percent. Examples of additional glycols include diethylene glycol; 1,4-cyclohexanedimethanol; propylene glycol, 1,4-butanediol, 2,2,4-trimethyl-1,3-pentanediol; 2,2-dimethyl-1,3-propanediol, etc.

In an alternative embodiment, the bis-dihydroxy ester prepolymer may be prepared from a mixture of terephthalic acid and ethylene glycol, as is widely known in the art.

The temperatures and pressures employed to produce PET based on the instant process are those conventional for polyester production.

The PET reaction product may then be extruded at an elevated temperature into water and allowed to solidify therein. The solid PET may then be pelletized by means known to those skilled in this art. For example, the PET may be pelletized using an underwater pelletizer.

The PET useful in the present invention may be in any form such as pellets, chips, or granules, preferably of relatively uniform size and shape. For ease of reference, the PET will hereinafter be referred to as PET chip but it is understood that the present invention is applicable to PET in any form and the term PET chip is meant to include PET in any form.

In an alternative embodiment, PET may be produced using a continous process in which the PET reaction product is directly extruded into final form, rather than chip. Such direct extrusion is known in the art for use in producing film, fiber, and other articles.

The PET thus produced generally generates approximately 60 25 to 90 wt % fewer gels than PET resin which does not contain the antioxidant package, as determined from samples subjected to 300° C. heat treatment for 48 hours in an inert atmosphere.

The PET chip of the instant invention also provides color suitable for use in fiber, film, and bottle resin applications. In the preferred embodiment color of sufficient quality to allow the PET resin to be used in applications replacing clear glass is provided.

The PET chip as prepared does not have physical properties suitable for use in all applications. In order to improve the physical properties of the PET chip, the chip is subjected to solid state polymerization, as is known in the art and described in U.S. Pat. No. 4,223,128.

The intrinsic viscosity of the PET resin is generally from about 0.50 to about 1.0, based on calculations made from measurements made in o-chlorophenol at 25° C.

The PET produced by the present invention may be used to produce fiber, film or food containers such as beverage bottles. The gel reduction of the instant invention allows a longer period to elapse before cleaning the polycondensation reactor in order to clear the dead spots of degraded polymer during polymer production. Cleaning is a time consuming process, which results in considerable loss of first quality polymer production. The use of the instant invention also leads to fewer required filter changes, thereby yielding fewer process upsets during fiber and film production. In addition, the reduction of gels leads to higher levels of first quality product. For PET resin intended for use in food applications, the instant invention provides the additional benefit of decreased levels of regenerated acetaldehyde.

The physical property values and characteristics in the present invention including Examples were measured or are defined as follows:

(1) Color Measurements

Color values for the instant invention are described in terms of yellowness and brightness. Yellowness and brightness are quantified respectively as the b* and L* values on a L*,a*,b* color scale, also referred to as the Gardner Color System, a color measurement technique well known to those skilled in this art. In the present method, the color of ground PET chip is determined using a Gardner XL-23 Colorimeter. The brightness value measures the total percentage reflectance of a sample. A value of 100 represents perfect reflectance. The particles are yellow if the "b" value is positive and blue if the "b" value is negative. One unit difference in these numbers is perceptible to the eye. In the instant invention, high L* and low b* values are desirable.

(a) Color Measurements of Heat Treated Samples:

Color was determined using samples prepared from amorphous resin which were subjected to a heat treatment of 240° C. for 24 hours in air following polycondensation. This heat treatment was employed in order to exaggerate the color shift induced in the polymer during degradation.

(b) Color Measurement of Untreated Samples:

Color was also determined for samples prepared from amorphous resin which had not been subjected to heat treatment following polycondensation.

(2) Gel Formation and Isolation:

(a) Gel Formation:

The amount of gels formed by a given sample was determined from samples subjected to elevated temperature for various lengths of time. Approximately 8 grams of substantially amorphous PET was ground to a particle size of 2 mm and subjected to 300° C. (approximately 292° C. sample temperature) in a chamber under nitrogen purge (0.5 SFPH) for various amounts of time. Samples intended for comparison were heat treated simultaneously, in order to reduce potential batch-to-batch variation.

(b) Gel Isolation:

Approximately 0.50 grams of thermally treated PET was placed in a flask and stirred. About 25 ml of hexaflouroisopropanol (HFIP) was added into the flask containing the degraded sample. The solution was stirred at room temperature until the degraded polymer was completely dissolved. For samples containing visible insoluble gels, a metal mesh was used to filter the gel. For clear solutions in which no gels were visible, a 1 micron filter screen with a syringe set up was used to filter the invisible gels. The filtered gels were rinsed with 10 ml of fresh HFIP. These isolated gels were then dried and weighed. The weight percentage of gels formed was calculated by comparison to the original sample weight.

EXAMPLES

The following Examples are given as specific illustrations of the claimed invention. It should be understood however, that the invention is not limited to the specific details set forth in these Examples. All parts and percentages in the Examples as well as in the remainder of the specification are by weight unless otherwise specified.

Examples 1 to 7

A series of antioxidants were evaluated for their effectiveness in preventing PET thermal and thermo-oxidative degradation. Color change in response to high temperature, in particular polymer yellowing, is one indication of polymer degradation. Therefore, color change subsequent to heat treatment was used as a screening device to determine the antioxidant packages which would be of further interest.

All samples were prepared using a 1 kilogram autoclave. Example 1 was prepared from DMT based PET, formed by the transesterification of dimethyl terephthalate and ethylene glycol according to a conventional method (235° C.) in the presence of approximately 330 ppm MnAc ester interchange catalyst. Following recovery of about 95% of the methanol theoretically produced by the prepolymeric mixture, approximately 100 ppm polyphosphoric acid (PPA) was added to stabilize the manganese catalyst. Approximately 285 grams of antimony trioxide ($Sb_2O_3$) was then added to the esterified prepolymer to act as a polycondensation catalyst. Following addition of the polycondensation catalyst, the esterified prepolymer mixture was subjected to elevated temperature (280° C.) and reduced pressure in order to produce polymer of a suitable molecular weight, as is known in the art.

Example 2, containing an antioxidant package of interest, was prepared using the method of Example 1, with the following exceptions. First, the polycondensation catalyst was allowed to equilibrate in the esterified monomer mixture for about 10 minutes subsequent to its addition. A tetrafunctional hindered phenol (hereinafter "T"), in the form of tetra bis(methylene (3,5-di-tert-butyl-4-hydroxyhydrocinnumate)) methane, commercially available as Irganox 1010 from Ciba Specialty Chemical, was then added to the esterified mixture. The hindered phenol was allowed to equilibrate in the mixture for approximately 10 minutes. Next, phosphonite (hereinafter "P"), in the form of Sandostab PEPQ from Clariant, was added to the esterified mixture in order to complete the antioxidant package AOP1. The esterified monomer mixture containing the antioxidant package was then subjected to elevated temperatures and reduced pressures equivalent to those of Example 1 in order to induce polycondensation, as is well known in that art.

Examples 3 and 4 were prepared using the process of Example 2, with the exception that Irganox 1135, a monofunctional hindered phenol (hereinafter "M") was substituted for Irganox 1010. Irganox 1135 is 3,5-di-tert-butyl-4-hydroxyhydrocinnamic acid, c7-9-branched alkyl esters, commercially available from Ciba Specialty Chemical. Example 3 represents the second antioxidant package of interest, AOP2.

Examples 5 through 7 were prepared using the process of Example 2.

Data illustrating the evaluation of the resin properties resulting from these various formulations is illustrated in Table 1.

TABLE 1

Effect of Antioxidant Type and Amount on Heat Treated Color.

| EX | Primary AOx ID | Amt (wt %) | P Amount (wt %) | Heat Treated b* |
|---|---|---|---|---|
| 1 | None | | 0 | 41.7 |
| 2 | T | 0.05 | 0.05 | 19.5 |
| 3 | M | 0.10 | 0.05 | 23.8 |
| 4 | M | 0.05 | 0.05 | 32.7 |
| 5 | T | 0.025 | 0.025 | 29 |
| 6 | T | 0.075 | 0.075 | 27.4 |
| 7 | T | 0.10 | 0.10 | 40.7 |

Analysis of Examples 1 through 4 indicates that the use of two component Antioxidant Package of the instant invention leads to a significant decrease in polymer degradation upon heating. Examples 2 through 4 indicates that either tetrafunctional or monofunctional hindered phenols are suitable for use in the instant invention. It is further shown that if a monofunctional hindered phenol is chosen for use, a slight excess of this more volatile antioxidant is recommended in order to compensate for losses incurred during polymer processing.

Based on the color shift induced in the heat treated PET chip of Examples 1 through 4, the color performance of various combinations of the antioxidant package used in Example 2 was investigated in Examples 5 through 7.

Although the data indicates that a range of 0.025 to 0.10 weight percent tetrafunctional phenol and phosphonite are effective, it is expected that use of amounts of up to 0.5 weight percent of both of these compounds would yield similar beneficial results.

Examples 8, 9 and 10

It is known that the presence of compounds during the polycondensation reaction can have a detrimental impact on polymer properties other than color. In order to investigate the effect of the selected antioxidant packages on a broader range of polymeric properties, a series of samples were prepared to evaluate the effect of the presence of antioxidants on polycondensation time, and untreated color.

Example 8 was prepared using the process of Example 1. Example 9 was prepared using the process and component quantities of Example 2. Example 10 was prepared using the process and component quantities of Example 3. The resulting resin properties are described in Table 2.

TABLE 2

Effect of Various Antioxidant Packages on Resin Properties

| Ex | AOx Pkg | PC Time (min) | Untreated Color L*, | b* |
|---|---|---|---|---|
| 8 | None | 140 (+/− 15) | 86.2, | 4.9 |
| 9 | AOP1 | 150 (+/− 20) | 85.0, | 4.6 |
| 10 | AOP2 | 160 | 83.9, | 3.6 |

A comparison of the Examples 8, 9 and 10 indicates that neither antioxidant package had a significant detrimental effect on the polymer process, as indicated by the similar times required for the polycondensation reaction.

As discussed earlier, polymer degradation may also be indicated by a shift in resin color from standard values. In general, the brightness (L*) of a polymer decreases and the yellowness (b*) of a polymer increases with increasing degradation. A comparison of the L* and b* values for the three samples indicates that no unusual color shift occurred due to the presence of either antioxidant package, a further indication that these specific antioxidants are compatible with the polymer process.

Examples 11 to 14

Subsequent to screening the effect of the selected antioxidants on general polymer properties, the effect of these additives on gel formation was determined. Examples 11 and 13 were prepared using the method of Example 1. Example 12 was prepared using the method and quantities of Example 2. Example 14 was prepared using the method and quantities of Example 3.

TABLE 3

Effect of Various Antioxidant Packages on Gel Formation

| EX | AOx Pkg | Heating Time (hrs) | Gel Quantity (wt %) |
|----|---------|--------------------|---------------------|
| 11 | None    | 72                 | 18.7                |
| 12 | AOP1    | 72                 | 2.5                 |
| 13 | None    | 48                 | 22                  |
| 14 | AOP2    | 48                 | 8                   |

A comparison of Example 12 with Example 11 indicates an 89% decrease in gel formation due to the use of a tetrafunctional hindered phenol in conjunction with phosphonite. Similarly, a comparison of Example 13 with Example 14 indicates that approximately 64% fewer gels are generated upon addition of appropriate amounts of monofunctional hindered phenol in conjunction with phosphonite.

These examples indicate that the use of a combination of monofunctional or tetrafunctional hindered phenols along with a trivalent phosphorous leads to a significant decrease in gel formation at no significant sacrifice to the remaining polymer properties. This decrease in gel formation subsequently gives rise to higher yields in polymer, fiber, and film production, thereby providing a more economical process.

Although the invention has been described with preferred embodiments, it is to be understood that variations and modifications may be employed without departing from the concept of the invention as defined in the following claims.

What is claimed is:

1. A process for producing a polyester (PET) resin, said process comprising the steps of:
   (a) providing a polymer processing stream comprising a prepolymeric mixture comprising bis (2-hydroxyethyl) terephthalate, a polycondensation catalyst, a primary antioxidant in the form of a hindered phenol, and a secondary antioxidant in the form of a phosphonite;
   (b) polycondensing said prepolymeric mixture into polymer resin;
   whereby a PET resin which produces a lower amount of gels is generated.

2. The process of claim 1, wherein the process is further comprised of subjecting said polymer resin of step (b) to extrusion in a water bath, thereby quenching said polymer resin, and pelletizing said quenched polymer resin.

3. The process of claim 2, wherein the process is further comprised of subjecting said pelletized resin to a solid state polymerization process.

4. The process according to claim 1, wherein said bis (2-dihydroxyethyl) terephthalate is provided by reacting dimethyl terephthalate and ethylene glycol in the presence of a transesterification catalyst.

5. The process according to claim 1 wherein said bis (2-hydroxyethyl) terephthalate is formed from the reaction of terephthalic acid with ethylene glycol.

6. The process according to claim 4, wherein said secondary antioxidant is added to a mixture comprised of a polycondensation catalyst which contains antimony and a primary antioxidant.

7. The process according to claim 5, wherein said secondary antioxidant is added to a mixture comprised of an polycondensation catalyst which contains antimony and a primary antioxidant.

8. The process according to claim 4 wherein the process further comprises:
   (a) precipitating said transesterification catalyst;
   (b) adding a polycondensation catalyst which contains titanium to the precipitated prepolymeric mixture.

9. The process according to claim 5 wherein said polymer processing stream is further comprised of a polycondensation catalyst which contains titanium.

10. The process according to claim 5 wherein said polymer processing stream is further comprised of a direct esterification catalyst which contains titanium.

11. The process according to claim 6, wherein said polycondensation catalyst which contains antimony may be chosen from the group consisting of: antimony trioxide, antimony oxalate, antimony glucoxide, antimony butoxide, and antimony dibutoxide.

12. The process according to claim 11, wherein said polycondensation catalyst further comprises a compound which contains titanium, thereby forming a mixture of antimony and titanium based polycondensation catalyst compounds.

13. The process according to claim 7, wherein said polycondensation catalyst which contains antimony may be chosen from the group consisting of: antimony trioxide, antimony oxalate, antimony glucoxide, antimony butoxide, and antimony dibutoxide.

14. The process according to claim 13, wherein said polycondensation catalyst further comprises a compound which contains titanium, thereby forming a mixture of antimony and titanium based polycondensation catalyst compounds.

15. The process according to claim 8, wherein the polycondensation catalyst which contains titanium may be chosen from the group consisting of the following organic titanates and titanium complexes: titanium oxalate, titanium acetate, titanium butylate, titanium benzoate, titanium isoprylate, and potassium titanyl oxalate.

16. The process according to claim 9, wherein the polycondensation catalyst which contains titanium may be chosen from the group consisting of the following organic titanates and titanium complexes: titanium oxalate, titanium acetate, titanium butylate, titanium benzoate, titanium isoprylate, and potassium titanyl oxalate.

17. The process according to claim 10, wherein the direct esterification catalyst which contains titanium may be chosen from the group consisting of the following organic titanates and titanium complexes: titanium oxalate, titanium acetate, titanium butylate, titanium benzoate, titanium isoprylate, and potassium titanyl oxalate.

18. The process according to claim 15, wherein said organic titanate is potassium titanyl oxalate.

19. The process according to claim 16, wherein said organic titanate is potassium titanyl oxalate.

20. The process according to claim 17, wherein said organic titanate is potassium titanyl oxalate.

21. The process according to claim 1, wherein said hindered phenol may be chosen from a group consisting of: monofunctional hindered phenol, difunctional hindered phenol, and tetrafunctional hindered phenol.

22. The process according to claim 21, wherein said hindered phenol is a tetrafunctional hindered phenol.

23. The process according to claim 22, wherein the tetrafunctional hindered phenol is tetra-bis (methylene (3,5-di-tert-butyl-4-hydroxyhydrocinnumate)) methane.

24. The process to claim 22, wherein said hindered phenol is present in the amount of 0.01 to 0.50 weight percent based on the weight of the polymer.

25. The process according to claim 24, wherein said hindered phenol is present in the amount of 0.05 weight percent, based on the weight of the polymer.

26. The process according to claim 1, wherein said phosphonite is an aryl phosphonite.

27. The process according to claim 26, wherein said aryl phosphonite is produced by the reaction of phosphorus trichloride with 1,1'-biphenyl and 2,4-bis(1,1-dimethylethyl) phenol.

28. The process according to claim 26, wherein said aryl phosphonite is present in an amount from 0.01 to 0.50 weight percent based on the weight of the polymer.

29. The process according to claim 28, wherein said aryl phosphonite is present in the amount of 0.05 weight percent based on the weight of the polymer.

30. The process according to claim 1, wherein:
(a) dimethyl terephthalate is reacted with ethylene glycol in the presence of a manganese acetate transesterification catalyst in order to form an esterified prepolymeric mixture;
(b) sequestering said manganese acetate transesterification catalyst using polyphosphoric acid;
(c) adding a 0.05 weight percent tetrafunctional hindered phenol, based on the weight of the polymer;
(d) equilibrating said esterified prepolymeric mixture containing said tetrafunctional hindered phenol;
(e) adding 0.05 weight percent aryl phosphonite, based on the weight of the polymer;
(f) polycondensing said prepolymeric mixture containing said tetrafunctional hindered phenol and phosphonite in order to form a polymer resin,
whereby a PET resin which produces a lower amount of gels is generated.

31. A resin comprising: polyethylene terephthalate, a hindered phenol, and phosphonite, said resin generating fewer gels than conventional PET resin.

32. Fiber, film, and food containers formed from PET resin which is further comprised of a hindered phenol and phosphonite, said resin generating fewer gels than conventional PET resin.

* * * * *